United States Patent [19]

Li

[11] 4,172,043

[45] Oct. 23, 1979

[54] COMPOSITION FOR ABSORPTION HEATING WITH FURAN-DERIVATIVE ABSORBENT

[75] Inventor: Chien C. Li, Williamsville, N.Y.

[73] Assignee: Allied Chemical Corporation, Morris Township, Morris County, N.J.

[21] Appl. No.: 818,038

[22] Filed: Jul. 22, 1977

Related U.S. Application Data

[60] Continuation-in-part of Ser. No. 734,775, Oct. 22, 1976, abandoned, which is a division of Ser. No. 567,043, Apr. 10, 1975, Pat. No. 4,005,584.

[51] Int. Cl.$^2$ .............................................. C09K 5/04
[52] U.S. Cl. .................................... 252/69; 62/112
[58] Field of Search ............................ 252/67, 68, 69; 260/347.3, 347.4, 347.5, 347.8; 62/112

[56] References Cited

U.S. PATENT DOCUMENTS

| | | | |
|---|---|---|---|
| 1,968,049 | 7/1934 | Midgley et al. | 252/67 X |
| 1,968,050 | 7/1934 | Midgley et al. | 252/67 X |
| 2,035,541 | 3/1936 | Fleischer | 252/69 X |
| 2,040,898 | 5/1936 | Zellhoefer | 252/69 X |
| 2,040,902 | 5/1936 | Zellhoefer | 252/69 X |
| 2,040,905 | 5/1936 | Zellhoefer | 252/69 X |
| 2,040,909 | 5/1936 | Zellhoefer | 252/69 X |
| 2,229,711 | 1/1941 | Walker et al. | 252/67 X |
| 3,353,366 | 11/1967 | Orfeo et al. | 252/69 X |
| 4,005,584 | 2/1977 | Li | 62/112 |
| 4,042,524 | 8/1977 | Nychka et al. | 252/69 |

OTHER PUBLICATIONS

Eiseman, "Why Refrigerant 22 Should be Favored for Absorption Refrigeration", ASHRAE Journal 45-50, 1959.

Zellhoefer, "Solubility of Halogenated Hydrocarbon Refrigerants in Organic Solvents", *Industrial & Engineering Chemistry*, vol., 1937, pp. 548-551.

Hainsworth, "Refrigerants and Absorbents", *Refrigerating Engineering*, vol. 48, No. 2, pp. 97-100 & No. 3, pp. 201-204, 1944.

Phillips, "Gas Air Conditioning Concepts", in *Proceedings of the Second Conference of Natural Gas Research and Technology*, Jun. 5-7, 1972.

Albright et al., "Solubility of Chlorofluoromethanes in Nonvolatile Polar Organic Solvents", *A.I.Ch.E. Journal*, Nov. 1972, pp. 668-672.

*Primary Examiner*—Harris A. Pitlick
*Attorney, Agent, or Firm*—Alan M. Doernberg; Jay P. Friedenson

[57] ABSTRACT

The invention comprises absorption pair compositions consisting essentially of selected one and two carbon fluorocarbon solutes dissolved in selected furan ring absorbents. These absorption pair compositions are useful in methods of absorption refrigeration, cooling and heating and particularly in an absorption heat pump.

14 Claims, No Drawings

COMPOSITION FOR ABSORPTION HEATING WITH FURAN-DERIVATIVE ABSORBENT

This application is a continuation-in-part of U.S. application Ser. No. 734,775, filed Oct. 22, 1976, entitled "Composition, Method and Apparatus for Absorption Heating", now abandoned, which in turn is a division of U.S. application Ser. No. 567,043, filed Apr. 10, 1975, entitled "Composition, Method and Apparatus for Absorption Heating", now U.S. Pat. No. 4,005,584.

This invention relates to novel absorption pairs for absorption heating and cooling.

In view of diminishing fossil fuel supplies, and hence, increasing fuel costs, there is a need to minimize the amount of fuel society consumes to heat habitable space.

The heat pump concept, wherein available energy is taken from an ambient source such as outside air, and combined with fuel energy to heat space, is not new. Existing concepts include electrically driven-vapor compression heat pumps and absorption heat pumps. The latter require an absorption pair which comprises a solvent and a solute wherein the solvent remains a liquid, which may be a solution, throughout the operation of the apparatus, and the solute having a liquid and vapor phase in the cycles of the operation. The solute must be soluble in the solvent and must be readily separable as a vapor from the solvent by means of evaporation. In addition, the solute must be suitable for condensation from the vapor back to a liquid form. In general, all absorption heating apparatus require essentially the same parts and function in essentially the same way regardless of the particular solute and solvent used. Nevertheless, heat pumps as disclosed in copending, commonly assigned applications of B. A. Phillips, Ser. No. 796,773, filed May 13, 1977, now U.S. Pat. No. 4,127,010 issued Nov. 28, 1978, Ser. No. 796,631, filed May 13, 1977, now U.S. Pat. No. 4,106,309 issued Aug. 15, 1978, Ser. No. 796,493, filed May 12, 1977, now U.S. Pat. No. 4,127,993 issued Dec. 5, 1978 and Ser. No. 796,084, filed May 12, 1977, now U.S. Pat. No. 4,127,009 issued Nov. 28, 1978 are preferred. The major components of the apparatus are a generator, condenser, evaporator, absorber and absorption pair (also called absorber pair). The solute passes through all units and the solvent, sometimes also known as the absorbent, is conconfined to movement through the generator and absorber.

In operation, a mixture of absorbent and solute is heated in the generator to boil off most of all of the solute which rises as a vapor through a connecting conduit to the condenser. The mixture may be heated in the generator by any suitable means such as a gas flame, geothermal heat, solar heat or warm water.

The generator and condenser operate at relatively high pressure, so the condensing temperature of the solute is sufficiently high to permit rejecting the latent heat emitted by the condensing solute to outside air or cooling water passing through or around the condenser.

The liquid solute leaving the condenser passes through a conduit to a throttling valve (or its equivalent), through the throttling valve and through another conduit to the evaporator. The throttling valve throttles the liquid solute to a lower pressure so it will boil at a relatively low temperature in the evaporator and thus absorb heat from air or water passing through or around the evaporator.

The vaporized solute passes from the evaporator through a conduit to the absorber where heat of mixing is emitted (preferably to cooling water passing therethrough) as it is dissolved in cool absorbent which has been carried to the absorber by means of a conduit connecting the absorber with a generator outlet. The mixture of absorbent and solute resulting in the absorber then passes through a conduit to the generator where it is reheated to continue the process.

Any suitable material of construction for the apparatus may be used which can withstand the encountered temperature, pressure and corrosive properties, if any, of the solvent and solute. Such a heat absorption apparatus is particularly desirable since moving parts, if any, are minimal when compared with the moving parts found in electrically driven-vapor compression heat pumps.

Unfortunately, the known solute/solvent systems for heat pumps have serious disadvantages. The most common solute/solvent pair (absorber or absorption pair) is ammonia/water. The ammonia/water pair has a disadvantage since the heating efficiency of apparatus utilizing the ammonia/water absorber pair is not as high as desired; i.e., the coefficient of performance (COP) practically attainable is generally less than about 1.30 and at low generator temperature, i.e., below 180° F., and at high generator temperatures, i.e. 220° F., is generally below about 1.40. COP is a measure of the efficiency of the absorption cycle and is the ratio of the heat output to the energy input. The ammonia/water combination has additional disadvantages. Water is highly volatile, thus preventing complete separation of the ammonia from the water in the generator at high generator temperatures. The condensing pressure required to condense the ammonia is undesirably high, thus requiring equipment capable of withstanding such pressure.

The only other presently commercial absorber pair is water/lithium bromide wherein water is used as the solute and lithium bromide is used as the absorbent. The water/lithium bromide absorber pair (and the related water/lithium chloride absorber pair) has undesirable characteristics. For example, water as a solute is limited to an evaporation temperature of above about 32° F., which is its freezing point. Lithium bromide is not sufficiently soluble in water to permit the absorber to be air cooled. The extremely low pressures in the system require large vapor conduits. Unless the system is precisely controlled, lithium bromide can crystallize and cause fouling of the system and the generator temperature cannot efficiently operate below 180° F. nor above 215° F. Additionally, aqueous lithium bromide solutions are corrosive, thus requiring special inhibitors and alloys for suitable apparatus.

Other absorber pairs which have been suggested have not been commercially accepted due to one or more disadvantages. Such disadvantages include a lack of sufficient affinity of the absorbent for the solute vapor, thus preventing sufficient absorption of the solute vapor to draw in and compress the solute. The absorber pairs have frequently not been mutually soluble over the whole range of operating conditions, thus permitting crystallization and the formation of solid articles which make it difficult or impossible for proper fluid circulation. The absorbent has frequently been too volatile, thus preventing the refrigerant vapor leaving the generator to be adequately purified. When absorbent evaporates from the generator, the efficiency of the system is frequently substantially reduced since energy input is wasted in evaporation. Additionally, the absorbent pairs previously suggested are frequently unstable, cause corrosion of the apparatus, are toxic or are highly flammable. Absorption pairs suggested in the prior art frequently have unacceptably high or unacceptably low working pressures. The working pressures should be as near to atmospheric pressure as possible to minimize equipment weight and minimize leaking into or out of the system. In addition, pressure difference between the high side and low side is frequently too high to facilitate circulation of the solution. The solutes suggested in the prior art frequently have a latent heat of evaporation which is unacceptably low, thus requiring large quantities of fluids to be circulated and the coefficient of performance of other absorber pairs suggested in the prior art is usually too low for serious consideration in commercial apparatus.

Some absorber pairs including a halogenated hydrocarbon solute (refrigerant) and an organic absorbent have been explored over the years for absorption refrigeration. Although certain specific absorber pairs wherein the absorbent included a furan-type ring had been proposed in U.S. Pat. No. 2,040,902 as a part of a program exploring numerous potential absorber pairs, no further discussion of furan-type absorbents has appeared in the art. Instead, subsequent exploratory work with organic absorbents has concentrated on acyclic glycol ethers and particularly on DMETEG (dimethoxytetraethylene glycol) and the ethyl ether of diethylene glycol acetate. More recently, and until the present invention, exploratory work on organic absorbents for halogenated hydrocarbon refrigerants has apparently lain dormant.

BRIEF DESCRIPTION OF THE INVENTION

In accordance with this invention, there is provided novel absorber pairs for absorption heating and refrigeration which have high coefficients of performance, have good stability, cause little corrosion, have relatively high flash points, operate at approximately atmospheric pressure and have relatively low toxicity. The high coefficient of performance is due to a strong affinity between the solute and solvent, good mutual solubility at absorber conditions and ease of separation at generator conditions, good absorbent volatility and a solute having a high latent heat of vaporization.

The new and useful compositions of matter of the invention comprises from about 4 to about 60 weight percent of a lower alkyl fluorocarbon selected from the group consisting of monochlorodifluoromethane, dichloromonofluoromethane, trifluoromethane, monochloromonofluoromethane, dichlorotrifluoroethane, monochlorotrifluoroethane, monochlorotetrafluoroethane and mixtures thereof dissolved in about 40 to about 96 weight percent of a furan ring containing compound having a boiling point between about 140° C. and 250° C. and being of the formula:

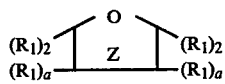

wherein $R_1$ is independently at each occurrence H; lower alkyl; lower alkoxy; phenyl; lower alkylene phenyl; hydroxy containing lower alkyl; lower alkyl carboxy; alkoxy alkyl of from 2 through 6 carbon atoms; lower alkylene carboxylate of from 2 through 6 carbon atoms; fluorine or chlorine; a is independently at each occurrence an integer of 1 or 2; and Z is a single or double bond; provided that, when Z is a single bond, a is 2, when Z is a double bond, a is 1, and provided that the compound contains at least one $R_1$ group having an oxygen atom which has a single bond to a carbon atom. When the fluorocarbon is dichloromonofluoromethane, the furan ring containing compound, however, is not

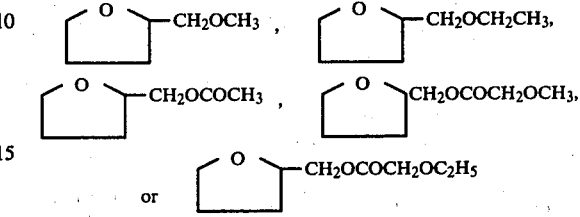

since the combination of dichloromonofluoromethane and these furan compounds are known prior art compositions (U.S. Pat. No. 2,040,902) generally disclosed for use in absorption refrigeration without any indication of their efficiency in either absorption refrigeration or absorption heating. Three of the above compositions contain double bonded oxygen atoms, and, while being acceptable compositions for use in the invention under the generic disclosure, are not preferred due to increased instability resulting from the double bonded oxygen atom. It has now been found that these compositions are unexpectedly highly efficient in a method and apparatus for absorption heating.

Some preferred compositions comprise:
from about 4 to about 60 weight percent of dichloromonofluoromethane dissolved in n-butyl tetrahydrofurfuryl ether based on the total weight of solution; from about 4 to about 60 weight percent of dichloromonofluoromethane dissolved in methyl-2,5-dihydro,2,5-dimethoxy-2-furan carboxylate based on the total weight of solution; from about 4 to about 60 weight percent of a lower alkyl fluorocarbon selected from the group consisting of monochlorodifluoromethane, trifluoromethane, monochlorofluoromethane, dichlorotrifluoroethane, monochlorotrifluoroethane, monochlorotetrafluoroethane and mixtures thereof dissolved in a furan ring containing solvent selected from methyl-tetrahydrofurfuryl ether, ethyl tetrahydrofurfuryl ether, propyltetrahydrofurfuryl ether, n-butyl tetrahydrofurfuryl ether and methyl-2,5-dihydro,2,5-dimethoxy-2-furan carboxylate based on the total weight of solution.

DETAILED DESCRIPTION OF THE INVENTION

In general, in accordance with this invention, the solvent used in the absorption pair is an assymetrical furan ring containing compound having a boiling point between about 140° and 250° C. The compound has the general formula

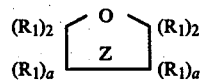

wherein $R_1$, a and Z are as previously defined and the compound contains at least one $R_1$ group having an oxygen atom which has a single bond to a carbon atom.

Lower alkyl, lower alkoxy, lower alkyl carboxy, or lower alkylene as used herein means alkyl, alkoxy or alkylene of from 1 through 5 carbon atoms. Examples of lower alkyl groups are —CH$_2$CH$_3$; —CH$_3$;

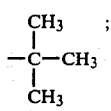

and —CH$_2$CH$_2$CH$_3$.

Examples of lower alkoxy groups are —OCH$_3$; —OCH$_2$CH$_3$

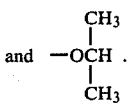

Phenyl groups are those groups containing a phenyl ring which is unsubstituted or substituted with methyl, ethyl, hydroxy, methoxy, ethoxy, methyl methoxy, fluorine or chlorine. Examples of phenyl groups are

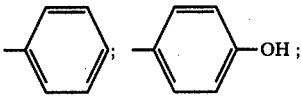

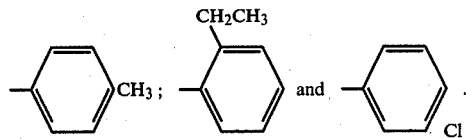

Lower alkylene phenyl groups are phenyl groups connected to the furan ring by a lower alkylene group. Examples of such groups are

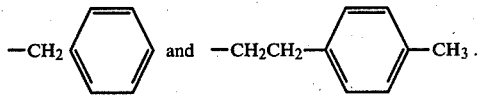

Examples of hydroxy containing lower alkyl groups are —CH$_2$OH; —CH$_2$CH$_2$OH and

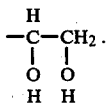

Examples of lower alkyl carboxy groups are —COOH; —CH$_2$COOH and —CH$_2$CH$_2$COOH.

Examples of alkoxy alkyl groups, i.e., those containing 2 to 6 carbon atoms, are —CH$_2$OCH$_3$; —CH$_2$OCH$_2$CH$_3$; —CH$_2$OCH$_2$CH$_2$CH$_3$; —CH$_2$OCH$_2$CH$_2$CH$_2$CH$_3$ and CH$_2$CH$_2$OCH$_3$. Preferred alkoxy alkyl groups are those containing either 5 or 6 carbon atoms due to higher efficiency at high generator temperature and due to increased stability, those alkoxy alkyl groups wherein the intermediate alkyl portion, i.e. that portion attached to the furan ring contains 2 or 3 carbon atoms. When the intermediate alkyl group is ethyl the furan ring compound unexpectedly exhibits improved solubility for the fluorocarbon.

Examples of lower alkylene carboxylate groups, i.e., those containing 2 to 6 carbon atoms, are —CH$_2$—COOCH$_3$;

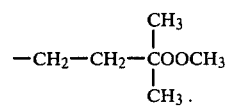

It is theorized that the boiling point of the simple furan ring is increased by adding an alkyl or an alkoxy group to the furan ring to form an assymetrical molecule. The added group should preferably permit an increase in the negative charge on the furan ring oxygen atom.

The furan ring containing compounds employed in the present invention are usually characterized by high flash points which reduce the flame hazard when they are used.

Assymetrical as used in relation to the furan ring containing compound means either that at least one of the R$_1$ groups at the 2 position on the fural ring is different from both of the R$_1$ groups at the 5 position or at least one of the R$_1$ groups at the 3 position is different from both of the R$_1$ groups at the 4 position. In the preferred furan ring compounds, at least one of the R$_1$ groups at the 2 position is different from both of the R$_1$ groups at the 5 position.

Alkyl as used above means an aliphatic hydrocarbon radical in which the hydrogens may be wholly or partially substituted by fluorine or chlorine.

The compound should preferably contain at least one R$_1$ group having an oxygen atom which is bonded on one side to a carbon atom or a hydrogen atom. At high generator temperatures, carboxy groups, particularly free rather than esterified carboxy groups, should be avoided since such groups tend to increase the corrosiveness of the compound and tend to decompose more rapidly than other groups. Carboxy groups are, however, suitable for compounds which will be used at low generator temperatures, i.e., below 225° F. The more preferred R$_1$ groups are those containing an alcohol or ether oxygen atom.

The foregoing furan ring containing compounds may be prepared by known procedures. Detailed discussions of the chemistry of furan and its derivatives are found in Chapter 4 of *Heterocyclic Compounds Volume I*, edited by Robert C. Elderfield, Wiley and Sons, Inc., 1950 and at pages 377 through 490 of *Advances in Heterocyclic Chemistry Volume 7*, edited by A. R. Katritzky and A. J. Boulton, Academic Press 1966.

A general method for preparation of furan ring containing compounds which are suitable for use in accordance with this invention is as follows:

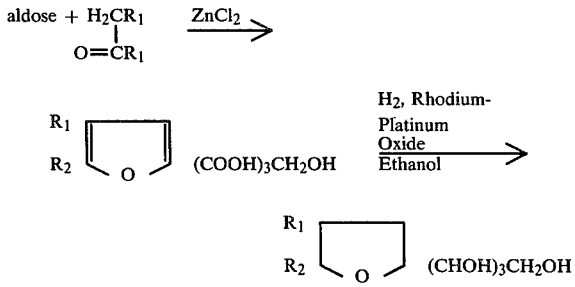

Where $R_1$ is independently at each occurrence any group as previously defined. $R_1$ may be carbonyl or carboxy; however, these groups will be reduced to alcohol groups upon hydrogenation. Such reduced groups may, however, be subsequently oxidized to a carbonyl or carboxyl group with a strong oxidizing agent such as $KMnO_4$, lead acetate or $HIO_4$.

Another general method for the preparation of furan ring containing compounds which are suitable for use in accordance with this invention is by ring formation from the enol form of a 1–4 carbonyl compound.

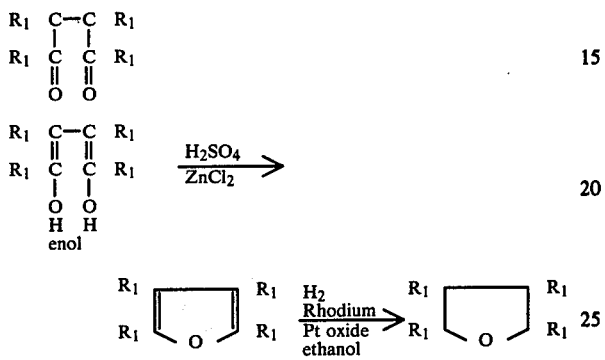

Again, $R_1$ may be any group as previously defined; however, since carbonyl and carboxyl groups may be reduced during hydrogenation such groups are generally preferably obtained by utilizing a suitable hydroxy alkyl (alkanol) group and oxidizing the hydroxy alkyl group to the desired carbonyl or carboxyl group subsequent to hydrogenation.

Some specific suitable furan ring containing compounds and their methods of preparation are as follows: A suitable catalyst for reduction of the furan ring to the tetrahydrofuran ring is a platinum oxide-rhodium catalyst.

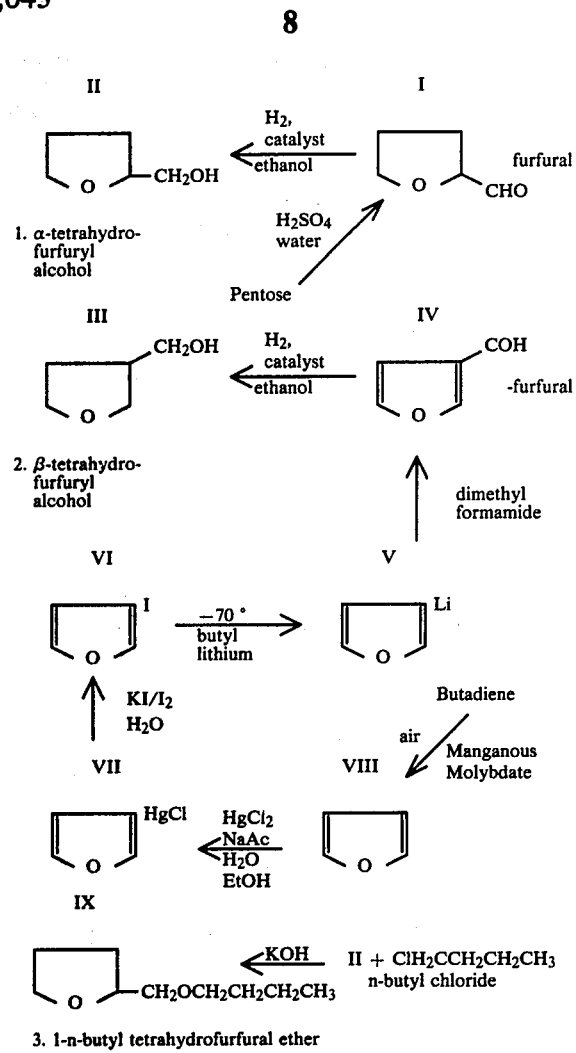

This compound, which is especially preferred, exhibits properties, when used in absorption pairs, which are unexpected over the prior art ethyl homolog. Prior to this invention, there existed no reason to expect the butyl compound to be so much more efficient in an absorption pair than the ethyl compound of the prior art.

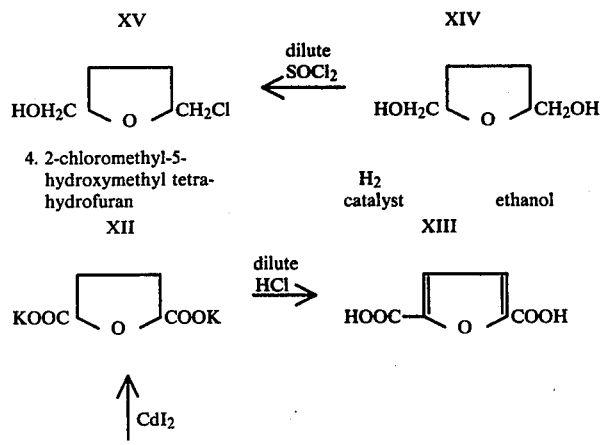

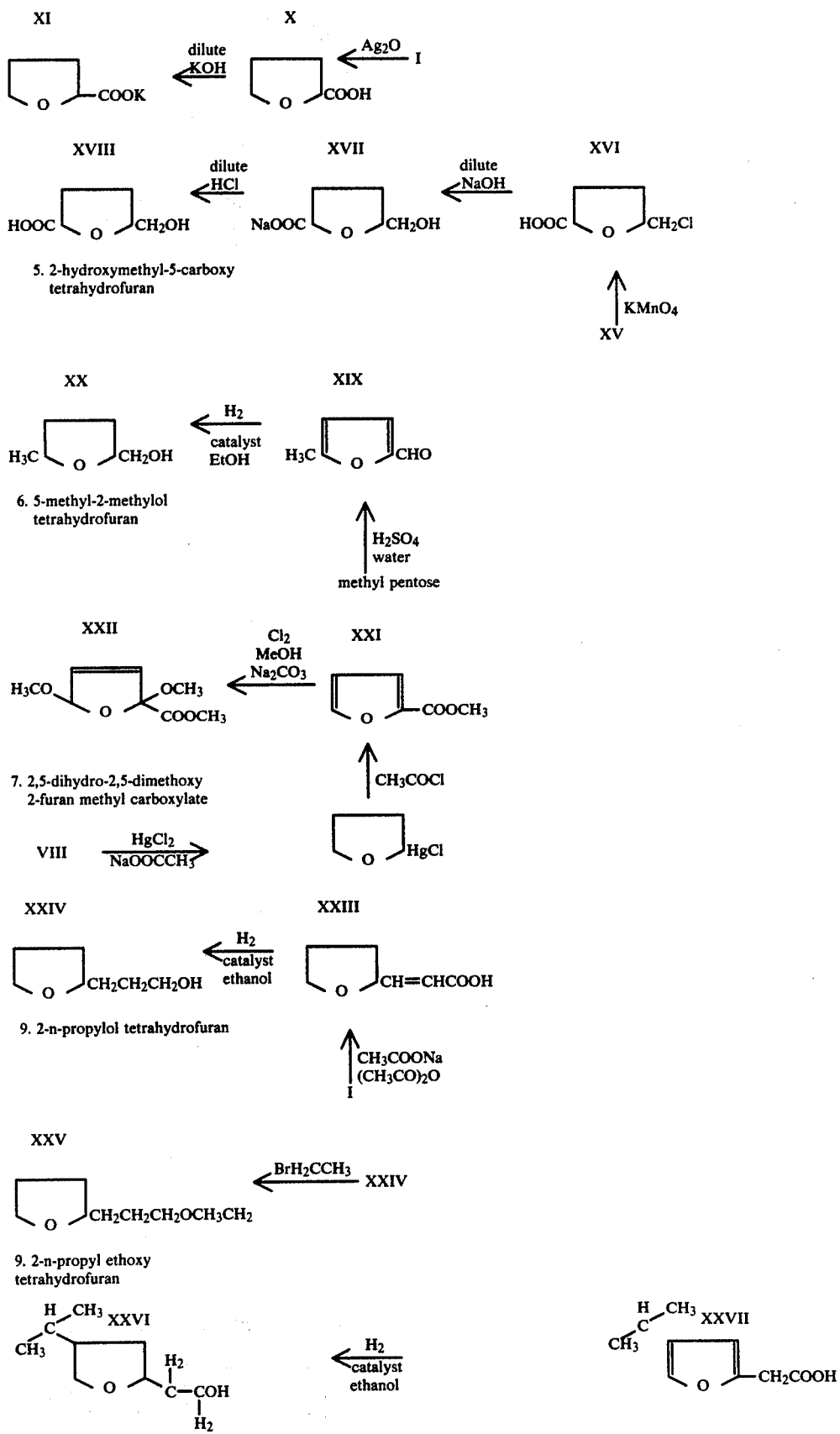

10. 2-ethylol-4-isopropyl tetrahydrofuran

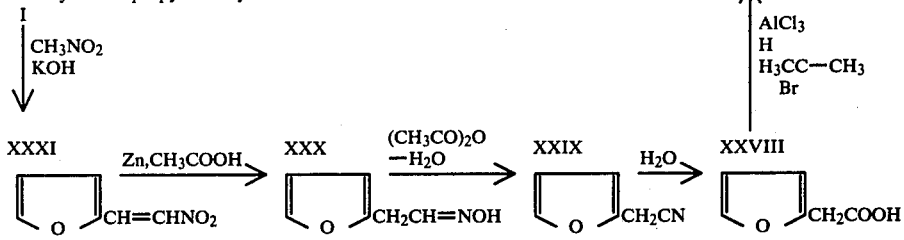

Examples of other suitable furan ring containing compounds which can be prepared in accordance with known methods are:

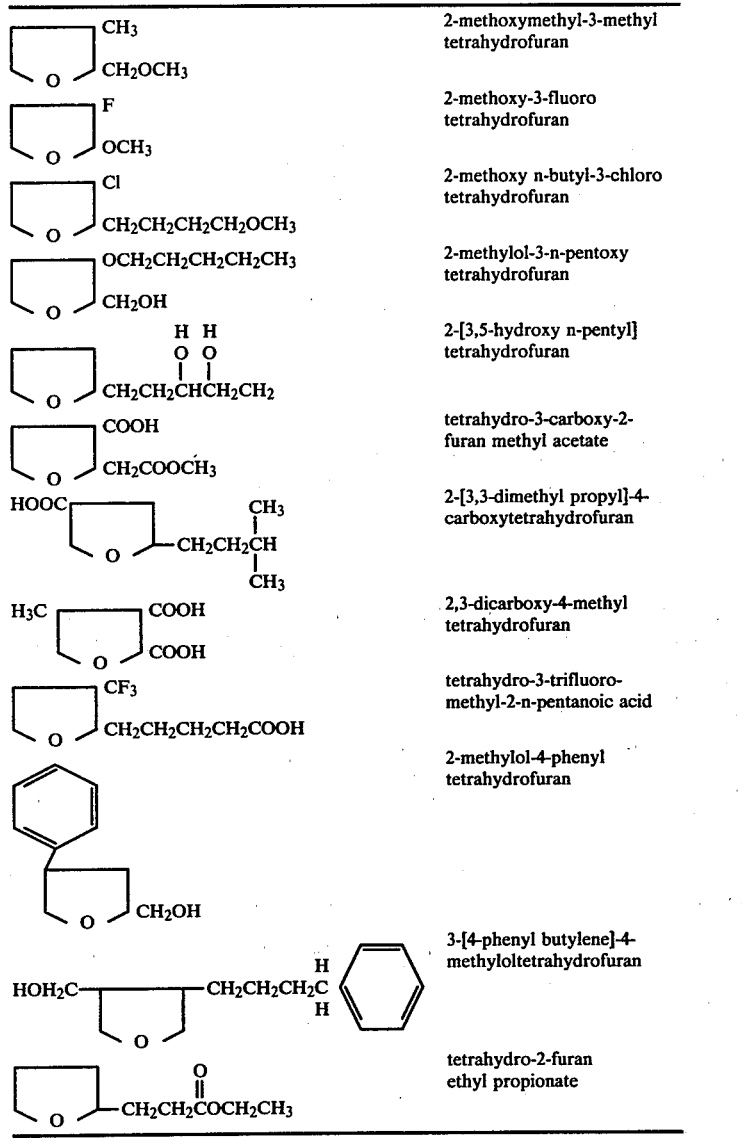

2-methoxymethyl-3-methyl tetrahydrofuran 2-methoxy-3-fluoro tetrahydrofuran 2-methoxy n-butyl-3-chloro tetrahydrofuran 2-methylol-3-n-pentoxy tetrahydrofuran 2-[3,5-hydroxy n-pentyl] tetrahydrofuran tetrahydro-3-carboxy-2-furan methyl acetate 2-[3,3-dimethyl propyl]-4-carboxytetrahydrofuran 2,3-dicarboxy-4-methyl tetrahydrofuran tetrahydro-3-trifluoro-methyl-2-n-pentanoic acid 2-methylol-4-phenyl tetrahydrofuran 3-[4-phenyl butylene]-4-methyloltetrahydrofuran tetrahydro-2-furan ethyl propionate The solute used in the absorption pair is a fluorinated methyl or ethyl group. The group preferably contains at least one hydrogen atom (and more preferably one only) and at least one chlorine atom and is assymetrical. It is believed that when fluorine and chlorine share the same carbon with hydrogen, the fluorine makes the chlorine less negative. Therefore the hydrogen atom becomes easily stretched once it "sees" to electron donor oxygen of the solvent. This hydrogen bonding force makes the primary contribution to the high solubility of the halogenated methane or ethane in the solvent.

For the halogenated ethanes, either or any isomer of the named compounds can be used, but the preferred isomers are $CHCl_2CF_3$, $CHClFCF_2Cl$, $CH_2ClCF_3$, CHClFCHF₂ and CHClFCF₃. Among the mixtures, CHClFCF₃ together with CH₂ClCF₃ (or with CHClFCHF₂) is preferred.

The preferred absorption pairs of the invention comprise a fluorocarbon selected from the group consisting of dichloromonofluoromethane (except for when the absorbent is one of the five disclosed therewith by Zellhoefer), monochlorodifluoromethane, trifluoromethane, monochloromonofluoromethane, dichlorotrifluoroethane, monochlorotrifluoroethane, monochlorotetrafluoroethane and mixtures thereof, dissolved in a furan ring containing solvent selected from 2-methyl-tetrahydrofurfuryl ether, 2-ethyl tetrahydrofurfuryl ether, 2-propyl tetrahydrofurfuryl ether, 2-butyl tetrahydrofurfuryl ether and methyl 2,5-dihydro-2,5-dimethoxy-2-furan carboxylate.

Many of these absorption pairs unexpectedly have very high efficiency at high generator temperatures, such as when the solvent is n-butyl tetrahydrofurfuryl ether. For example, at a generator temperature of 370° F., a COP of about 1.60 can be obtained using n-butyl tetrahydrofurfuryl ether and dichloromonofluoromethane as the absorption pair whereas when ethyl tetrahydrofurfuryl ether is used in conjunction with dichloromonofluoromethane at 370° F., a COP of about 1.58 is obtained which, while indicating a very high efficiency, is about 3.5 percent less efficient in heating improvement than when the n-butyl tetrahydrofurfuryl ether is used. In calculating the comparative COP's between the butyl and the ethyl solvents, an evaporator temperature of 45° F., a condenser temperature of 120° F. and an absorber temperature of 125° F. are assumed. The potential savings of heat exchange between fluid pathways is disregarded. Under these conditions, the efficiencies for the butyl and ethyl solvents are highest between about 325° and about 400° F. and are maximized at the 370° F. generator temperature. When methyl tetrahydrofurfuryl ether is used as the solvent under the foregoing conditions, the system is inoperative due to evaporation of the methyl solvent from the generator. When the generator temperature is lowered at the same evaporator, condenser and absorber temperatures, the maximum COP obtainable when the methyl solvent is used is about 1.57. The preferred absorption pair composition when ethyl or butyl absorbents are used is from about 10 to about 60 weight percent of fluorocarbon, preferably dichloromonofluoromethane or one of the halogenated ethanes, by weight of absorbent.

In many preferred forms the fluorocarbon is selected from dichlorotrifluoroethane, monochlorotetrafluoroethane, monochlorotetrafluoroethane and mixtures thereof. For such halogenated ethanes, it is preferred that the furan compound be

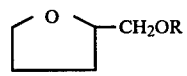

with R being alkyl having 1-4 carbons, preferably ethyl, n-propyl, i-propyl, n-butyl or i-butyl and most preferably ethyl or n-butyl. Other preferred compositions have as absorbent

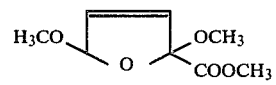

and as refrigerant dichloromonofluoromethane, monochlorodifluoromethane, dichlorotrifluoroethane, monochlorotrifluoroethane, monochlorotetrafluoroethane or mixtures thereof, with dichlorotrifluoroethane, monochlorotrifluoroethane or mixtures thereof being more preferred.

Similarly, the system employing ammonia as the solute and water as the solvent cannot be operated at either high generator temperatures or at low generator temperatures and the maximum COP practically obtainable with the ammonia and water system at any generator temperature is about 1.5.

Those absorption pairs wherein the solvent is methyl 2,5-dihydro-2,5-dimethoxy-2-furan carboxylate can be used at high generator temperatures but only at low COP values; however, those pairs wherein the solvent is the carboxylate, unexpectedly have higher COP values at low generator temperatures than any other known absorption pair. For example, at an evaporator temperature of 45° F., a condenser temperature of 125° F. and an absorber temperature of 125° F., the COP of a system using dichloromonofluoromethane and methyl 2,5-dihydro-2,5-dimethoxy-2-furan carboxylate would be about 1.4 at a generator temperature of 370° F., but would be about 1.5 at the very low generator temperature of 160° F. No other known absorption pair would have a COP as high as about 1.5 at a generator temperature of 160° F. under the same conditions.

The preferred absorption pair composition when the 2,5-dihydro-2,5-dimethoxy-2-furan carboxylate absorbent is used is from about 10 to about 60 weight percent fluorocarbon, preferably dichloromonofluoromethane.

When methyl 2,5-dihydro-2,5-dimethoxy-2-furan carboxylate is used, the preferred temperature to which the solution is heated in the generator is preferably between about 150° and 300° F. and most preferably between about 160° and about 210° F. Such low generator temperatures are particularly suitable for low temperature heat sources such as solar energy.

The preferred fluorocarbon solute for use in accordance with the method of the invention is dichloromonofluoromethane due to its stability and desirable vaporization temperature at or near atmospheric pressure.

In general, all of the foregoing fluorocarbon solutes have been found to be suitable solutes over a broad range of generator temperatures for the release of solute. Acceptable generator temperatures for use with these fluorocarbons range from about 150° F. to about 425° F. Dichloromonofluoromethane is generally the preferred solute for use over this temperature range since a higher COP is usually obtained. The remaining foregoing fluorocarbons are, however, preferred in special applications, for example, when lower evaporator temperatures are desired.

The higher generator temperatures, i.e., from about 250° to about 425° F. result in higher COP's. Highest temperatures generally result in undesirable decomposition. The most preferred generator temperature to retain high COP's and low decomposition is from about 300° to about 350° F. The lower generator temperatures are used when low temperature heat sources such as solar heat are to be used to heat the generator.

The temperature at which the absorption of the solute into the solvent occurs is preferably from about 90° to about 130° F. A large percentage of the heat released in absorption heating occurs when heat of mixing is released during absorption of the solute by the solvent and the heat of mixing released is higher at a lower absorption temperature. The temperature of the absorption is; however, limited by the temperature of the area to be heated since the absorber provides heat to, and is cooled at the temperature of, such area.

The fluorocarbon solute, e.g., dichloromonofluoromethane is preferably evaporated at between about −5° and about 50° F. The most preferred evaporation temperature is between about 35° F. and 50° F. to avoid problems of excess condensation and ice formation at the evaporator.

The absorption heating apparatus of the invention, as previously discussed, comprises known absorption heating apparatus components in conjunction with the absorption pairs disclosed for use in the novel absorption heating method.

EXAMPLE 1

An absorption pair, consisting of 50 weight percent dichloromonofluoromethane solute in methyltetrahydrofurfuryl ether solvent by weight of solution, is introduced into an absorption heating apparatus consisting essentially of a generator, condenser, evaporator and absorber. The condenser is cooled with water to maintain a temperature of 125° F. in the condenser and absorber, and a gas flame is provided under the generator to obtain a generator temperature of 300° F. A throttling valve is provided between the condenser and evaporator which is adjusted to maintain an evaporator temperature of 45° F. and a high pressure in the generator and condenser and a low pressure in the evaporator and absorber. In example 1, the generator and condenser is 60.2 p.s.i.a. and the pressure in the evaporator and absorber is 13.8 p.s.i.a. The heat input and output were determined as described below in relation to Examples 10–42. The $COP_H$ for the absorption system is calculated to be 1.545 indicating a very high efficiency.

EXAMPLE 2

Example 1 is repeated except ethyltetrahydrofurfuryl ether is substituted for methyl tetrahydrofurfuryl ether. The COP is calculated to be 1.540.

EXAMPLE 3

Example 1 is repeated except butyltetrahydrofurfuryl ether is substituted for methyl tetrahydrofurfuryl ether. The COP is calculated to be 1.514.

EXAMPLE 4

Example 1 is repeated except a saturated solution of ammonia in water at 125° F. at absorber pressure is used as the absorption pair. The COP is calculated to be only 1.243 which is low compared to the systems of the invention illustrated in examples 1, 2 and 3.

EXAMPLE 5

Example 1 is repeated except the generator temperature is increased to 350° F. The COP is calculated to be 1.572.

EXAMPLE 6

Example 2 is repeated except the generator temperature is increased to 350° F. The COP is calculated to be 1.577.

EXAMPLE 7

Example 3 is repeated except the generator temperature is increased to 350° F. The COP is calculated to be 1.582 which is a higher COP than is obtainable from any known absorption system which is not operated at extremely low pressures requiring expensive apparatus to handle the vacuum.

EXAMPLE 8

An attempt to repeat example 4 at a generator temperature of 350° F. is found to be impractical since generator pressures required to prevent vaporization of the water solvent in the ammonia/water system are unacceptably high.

EXAMPLE 9

Example 1 is repeated except methyl 2,5-dihydro-2,5-dimethoxy-2-furan carboxylate is substituted for methyl tetrahydrofurfuryl ether and the generator temperature is lowered to 160° F. The COP is calculated to be 1.5 which is a very high COP at such a low generator temperature. Such a system would be suitable for low temperature heat sources such as solar energy.

EXAMPLES 10–42

Calculations were made for absorption cycles of 40° F. evaporator temperature, 120° F. condensing temperature and 110° F. absorber temperature. The latter temperature is the minimum absorber temperature which corresponds to a maximum refrigerant concentration in the rich solution. These values are representative of most air conditioning conditions and moderate heating conditions. The thermodynamic advantages to be gained by heat exchange between different pathways as described in copending application Ser. No. 796,773, referenced above, have been disregarded, except for liquid heat exchange between the rich and weak solutions passing between the absorber and generator. Pure refrigerant refrigerant has been assumed in the condenser and evaporator.

The COP values were obtained by assuming a 40° F. evaporator, a 120° F. condenser temperature and a 110° F. absorber temperature. Saturated amounts of refrigerant in absorbent at the absorber temperature (110° F.) and the generator temperature (250°, 300°, 350° or 400° F.) were determined experimentally. From the known heats of vaporization of the pure refrigerant, a refrigerant flow rate was determined necessary to produce 12,000 BTU/hour of cooling (1 ton of refrigeration) in the evaporator. Solution flow rates necessary to conduct that quantity of refrigerant to the higher pressure were then calculated. The mass flow rate from the generator to the absorber was calculated from the other flow rates. A temperature differential of 10° F. was assumed for a heat exchanger such that the heat loss of the weak liquid from the generator temperature down to 120° (10° F. above the absorber temperature) was assumed to have been used to heat the rich liquid from the absorber temperature of 110° F. The remaining heat required to raise the rich liquid to the generator temperature and to vaporize the required amount of refrigerant was therefore calculated as the generator heat input.

In the above calculations, for heating of solutions, it was assumed that the heat quantities for solutions would be the sum of the heat quantities for refrigerant and for absorbent. Thus if a first quantity of pure refrigerant released 344 BTU by cooling from the generator temperature to 120° F. and a second quantity of pure absorbent released 23,555 BTU by cooling from the generator temperature to 120° F., then it was assumed that a weak liquid having the first quantity of refrigerant and the second quantity of absorbent would release 23,899 BTU in the heat exchanger. That 23,899 BTU was apportioned between the refrigerant and absorbent of the rich liquid to determine how hot the rich liquid would be after being preheated in the heat exchanger.

The COP cooling values were calculated as 12,000 BTU divided by the sum of the three heat input components at the generator; the amount required to heat the absorbent from the heat exchanger temperature to the generator temperature, the amount required to heat the refrigerant from the heat exchanger temperature to the generator temperature and the amount required to vaporize the refrigerant. The relatively small amount of work required to pump the rich solution from the low absorber pressure to the high generator pressure was disregarded.

Since the above COP value represents a ratio between heat inputs at the generator and evaporator, a COP heating value can be calculated as 1+COP cooling. This calculation assumes that all of the heat inputs at the generator and evaporator translates into heat output at the absorber and condenser which can be put to use. The COP value representing the ratio of heat input to the evaporator/heat input to the generator is also called $COP_c$. This number plus one would be the $COP_H$ or total heat output of the system/heat input to the generator. It will be appreciated that the total heat output includes condenser and absorber heat output. Energy consumption by solution and coolant pumps have been ignored.

Table 1

Flow Rates, Solution Concentrations and COP Values For One Ton of Refrigeration At 40° Evaporator Pressure, 120° F. Condenser Temperature, 110° Absorber Temperature Using ETFE As Absorbent

| Example | Generator Temp. | Mass Flow Rich Liquor (lb/hr) | Mass Flow Refrigerant (lb/hr) | Concentration Rich Liquor (Wt. % R124) | Concentration Weak Liquor (Wt. % R124) | $COP_c$ |
|---|---|---|---|---|---|---|
| 10 | 400 | 549 | 250.7 | 50 | 8.0 | 0.499* |
| 11 | 350 | 614 | 250.7 | 50 | 15.5 | 0.573* |
| 12 | 300 | 713 | 250.7 | 50 | 22.9 | 0.436 |
| 13 | 250 | 1049 | 250.7 | 50 | 34.3 | 0.412 |
|   |   |   |   | Wt. % R123 | Wt. % R123 |   |
| 14 | 400 | 383 | 183.8 | 48 | 0 | 0.480 |
| 15 | 350 | 394 | 183.8 | 48 | 2.5 | 0.527 |
| 16 | 300 | 449 | 183.8 | 48 | 12.0 | 0.562 |
| 17 | 250 | 650 | 183.8 | 48 | 27.5 | 0.558 |
|   |   |   |   | Wt. % R21 | Wt. % R21 |   |
| 18 | 400 | 348 | 144 | 43 | 3.0 | 0.546 |
| 19 | 350 | 386 | 144 | 43 | 9.0 | 0.571 |
| 20 | 300 | 473 | 144 | 43 | 18.0 | 0.596 |
| 21 | 250 | 731 | 144 | 43 | 29.0 | 0.566 |

*These calculated values are uncertain because the pure refrigerant would be superheated rather than liquid at the hot end of the heat exchanger.

With proper design, $COP_c$ values over 0.65 have been achieved for R21/ETFE at a 300° F. generator temperature. Similar results may be obtainable with R124 at a 350° F. generator temperature and with R123 at a 300° F. generator temperature. Similar results may be obtainable for the following absorption pairs at the following generator temperatures:

|   |   | Generator Temperatures |
|---|---|---|
| 22* | R124/nBTFE | 350° F. |
| 23* | R124/nBTFE | 400° F. |
| 24 | R124/ETFE | 300° F. |
| 25* | R124/ETFE | 350° F. |
| 26 | R21/ETFE | 250° F. |
| 27* | R21/ETFE | 300° F. |
| 28* | R21/ETFE | 350° F. |
| 29* | R21/nBTFE | 350° F. |
| 30* | R21/nBTFE | 400° F. |
| 31 | R123/ETFE | 250° F. |
| 32* | R123/ETFE | 300° F. |
| 33* | R123/ETFE | 350° F. |
| 34 | R133a/ETFE | 250° F. |
| 35 | R133a/ETFE | 300° F. |
| 36* | R133a/ETFE | 350° F. |
| 37 | R133a/EFTE | 250° F. |
| 38 | R133/ETFE | 300° F. |
| 39 | R123 (50 Wt. %), R124 (50 wt. %)/ETFE | 300° F. |
| 40 | R133 (50 Wt. %), R133a (50 Wt. %)/ETFE | 300° F. |
| 41 | R123 (50 Wt. %), R133 or 133a (50 Wt. %)/ETFE | 300° F. |
| 42 | R21 (50 Wt. %), R124 (50 Wt. %)/ETFE | 300° F. |

R133=$CF_2HCHClF$, R133a=$CF_3CH_2Cl$, R124=$CF_3CHClF$, R123=$CF_3CHCl_2$ (R123a=$CF_2ClCHClF$ may also be used), R21=$CHCl_2F$, ETFE=ethyltetrahydrofurfuryl ether, nBTFE=n-butyl tetrahydrofurfuryl ether. The starred examples represent compositions that may be unstable at the indicated generator temperatures. For long-term operation, such compositions particularly should be stabilized as provided in application Ser. No. 760,489, of M. B. Berenbaum et al. filed Jan. 19, 1977, now U.S. Pat. No. 4,072,027 issued Feb. 7, 1978.

I claim:

1. A composition of matter comprising from about 4 to about 60 weight percent of a lower alkyl fluorocarbon selected from the group consisting of monochlorodifluoromethane, dichloromonofluoromethane, trifluoromethane, monochloromonofluoromethane, dichlorotrifluoroethane, monochlorotrifluoroethane, monochlorotetrafluoroethane and mixtures thereof dissolved in about 40 to 96 weight percent of

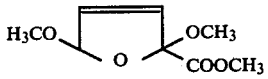

2. A composition of matter according to claim 1 wherein said fluorocarbon is dichloromonofluoromethane.

3. A composition of matter in accordance with claim 1 wherein said fluorocarbon is selected from the group consisting of dichlorotrifluoroethane, monochlorotrifluoroethane and mixtures thereof.

4. A composition of matter comprising from about 4 to about 60 weight percent of a lower alkyl fluorcarbon selected from the group consisting of monochlorodifluoromethane, dichloromonofluoromethane, trifluoromethane, monochloromonofluoromethane, dichlorotrifluoroethane, monochlorotrifluoroethane, monochlorotetrafluoroethane and mixtures thereof dissolved in about 40 to 96 weight percent of n-butyl tetrahydrofurfuryl ether.

5. A composition of matter according to claim 4 wherein said flurorcarbon is dichloromonofluoromethane.

6. A composition of matter according to claim 4 wherein said fluorocarbon is selected from the group consisting of dichlorotrifluoroethane, monochlorotrifluoroethane, monochlorotetrafluoroethane and mixtures thereof.

7. A composition of matter comprising from about 4 to about 60 weight percent of a lower alkyl fluorocarbon selected from the group consisting of —CHClFCClF$_2$—, CHClFCHF$_2$ and mixtures thereof dissolved in about 40 to 96 weight percent of an assymetrical furan ring containing compound, said compound having a boiling point between about 140° C. and 250° C. and the generic formula:

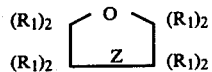

wherein $R_1$ is independently at each occurrence H; lower alkyl; lower alkoxy; phenyl; lower alkylene phenyl; hydroxy containing lower alkyl; lower alkyl carboxy; alkoxy alkyl of from 2 through 6 carbon atoms; lower alkylene carboxylate of from 2 through 6 carbon atoms; fluorine or chlorine; a is independently at each occurrence an integer of 1 or 2; and Z is a single or double bond; provided that, when Z is a single bond, a is 2, when Z is a double bond, a is 1, and provided that the compound contains at least one $R_1$ group having an oxygen atom which has a single bond to a carbon atom.

8. A composition of matter in accordance with claim 7 wherein said assymetrical furan ring containing compound is of the formula

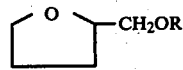

where R is alkyl having 1–4 carbons.

9. A composition of matter in accordance with claim 8 wherein R is selected from ethyl, n-propyl, i-propyl, n-butyl and i-butyl.

10. A composition of matter in accordance with claim 8 wherein R is ethyl.

11. A composition of matter in accordance with claim 8 where said fluorocarbon is CHClFCF$_2$Cl.

12. A composition of matter in accordance with claim 8 where said fluorocarbon is CHClFCHF$_2$.

13. A composition of matter in accordance with claim 7 where said fluorocarbon is CHClFCF$_2$Cl.

14. A composition of matter in accordance with claim 7 where said fluorocarbon is CHClFCHF$_2$.

UNITED STATES PATENT AND TRADEMARK OFFICE
CERTIFICATE OF CORRECTION

PATENT NO. : 4,172,043

DATED : October 23, 1979

INVENTOR(S) : Chien C. Li

It is certified that error appears in the above-identified patent and that said Letters Patent are hereby corrected as shown below:

Column 1, line 48: "conconfined" should read --confined--.

Column 4, line 56: "assymetrical" should read --asymmetrical--.

Column 6, line 12: "assymetrical" should read --asymmetrical--.

Column 6, line 20: "Assymetrical" should read --Asymmetrical--.

Column 8, line 38: "tetrahydrofurfural" should read --tetrahydrofurfuryl--.

Column 11, line 65: "assymetrical" should read --asymmetrical--.

Column 18, line 19: "R133a/EFTE" should read --R133/ETFE--.

Column 19, line 20: "fluorcarbon" should read --fluorocarbon--.

Column 19, line 29: "flurorcarbon" should read --fluorocarbon--.

Column 19, line 39: "-CHClFCClF$_2$-" should read --CHClFCClF$_2$--.

UNITED STATES PATENT AND TRADEMARK OFFICE
CERTIFICATE OF CORRECTION

PATENT NO. : 4,172,043

DATED : October 23, 1979

INVENTOR(S) : Chien C. Li

It is certified that error appears in the above-identified patent and that said Letters Patent are hereby corrected as shown below:

Column 19, lines 40-41: "assymetrical" should read --asymmetrical--.

Column 20, line 20: "assymetrical" should read --asymmetrical--.

Column 20, line 6: "$(R_1)_2$" at each occurrence should read --$(R_1)_a$--.

Signed and Sealed this

Twelfth Day of February 1980

[SEAL]

Attest:

SIDNEY A. DIAMOND

Attesting Officer

Commissioner of Patents and Trademarks